: 3,150,927
PRODUCTION OF BASIC LEAD CARBONATE
Robert J. Walsh, Dayton, Ohio, assignor to Monsanto Company, a corporation of Delaware
No Drawing. Filed May 2, 1961, Ser. No. 107,033
5 Claims. (Cl. 23—70)

The present invention relates to the production of basic lead carbonate. It is an object of the invention to manufacture an improved form of basic lead carbonate as well as combination compositions thereof, together with other metal oxides. It is also an object of the invention to produce basic lead carbonate in the form of hexagonal platelets.

Basic lead carbonate has been prepared by classical chemical processes, particularly for use as pigments. However, the particles obtained by the known processes are quite large so that the use of such particles in industrial processes has required the use of expensive grinding procedures. It has now been found that basic lead carbonate may be produced as a very fine particle size material existing as thin hexagonal plates. It has also been discovered that the basic lead carbonate may be produced as an intimate admixture with certain other metal oxides, particularly non-reducible metal oxides over such magnesia and alumina in order to produce a raw material which is suitable for use in the manufacture of hard lead by powder metallurgy processes.

The exact mechanism of the formation of the present basic lead carbonate by the present process has not been completely elucidated, but it would appear to be thermodynamically possible to form any of the possible products such as the various lead oxides, elemental lead metal, lead carbonate or basic lead carbonate. However, the present invention is based upon the control of the relatively large number of such products by regulation of the temperature of the flowing gas stream carrying the various products of thermotransformation and by regulating the partial pressure of carbon dioxide in such gas stream. It has been found that the flame temperature of the oxidizing flame employed in the present invention may be maintained over a wide range, such as from 600° C. to 1600° C., but that the after-regulation of temperature to obtain the desired basic lead carbonate should be in the range of from 50° C. to 600° C., or preferably from 75° C. to 400° C. for a period of time of 0.01 second to 1 second. The temperature referred to is the temperature of the combustion products which carry the finely divided solids from the combustion zone to the collection zone of the apparatus.

Another variable for the obtainment of the desired basic lead carbonate is the regulation of the partial pressure of carbon dioxide in conjunction with the aforesaid temperature ranges. Regulation of the partial pressure of carbon dioxide may be effected by various methods such as the regulation of the type of feed gas, for example, a reduction of the carbon dioxide content of a natural gas combustion flame may be brought about by introducing hydrogen with the natural gas ordinarily employed for combustion. Similarly, the carbon dioxide content may be increased by the employment of gaseous feeds containing higher proportions of carbon, for example, carbon monoxide. In general, it has been found that the partial pressure of carbon dioxide in the flowing gas stream maintained at the aforesaid temperatures should be in the range of from 1% to 50%, or preferably from 2% to 20%, and still more preferably from 4% to 9% by volume.

It has been found that an extremely finely divided, monocrystalline form of basic lead carbonate consisting of thin hexagonal platelets may be produced with an average diameter in the range of 0.1 to 0.4 micron and an average thickness of 0.01 to 0.04 micron. For example, an average particle diameter of 0.4 micron can be obtained by the oxidation of a solution of lead acetate dissolved in water or methanol. In general, the lead is introduced into the process as compounds or salts which are soluble in water or organic solvents, i.e., chlorate, perchlorate, nitrate, acetate, persulfate, etc. The said compounds may be employed as the anhydrous form or as any hydrate, such as the dihydrate, or tetrahydrate. The concentration of the salt may range from 1% by weight (anhydrous basis) to as high as the saturation limit. The organic solvent in general is an organic liquid, such as an alcohol or a ketone, having less than 5 carbon atoms, for example, methanol, ethanol, n-propanol, isopropanol, butanol, isobutanol, tert.-butanol, methyl ethyl ketone, acetone or dioxane.

In carrying out the process of the present invention, the solution of the metal components is first atomized by contacting with a high velocity atomizing gas stream which may be inert (for example, nitrogen), or may contain oxygen either as a pure stream of oxygen or as air. The atomizing gas may also be combustible, for example, hydrogen or natural gas may be used. The atomizing gas stream is supplied in sufficient quantity to atomize the liquid feed. The gases employed in the present process may be purified in order to avoid contamination of the product. The combustion gases such as hydrogen, natural gas and carbon monoxide should be free of difficultly combustible constituents such as tarry hydrocarbons so as to avoid the formation of organic occlusions. Secondary gas streams, such as an auxiliary air stream, may also be employed in order to promote complete combustion, and to prevent the deposition of product on the walls of the oxidation vessel. The present process is carried out at a high temperature so that it is desirable to provide a refractory vessel which may be vertically or horizontally disposed. The particles leaving the oxidation zone are cooled by direct or indirect heat exchange and are then collected by suitable means such as a water scrubber, a cyclone separator, electrostatic precipitator, bag filters, etc.

When combustion occurs, the fuel gas and/or the solvent gases are burned, preferably as an oxidizing flame, to provide uniform heating and at the same time permit decomposition of the metal salts. The atomizing carrier gas may be employed in the minimum amount required to atomize the solution or may be used in excess, for example, in the amount required for combustion in order to heat the mixture to reaction temperature. In order to provide for sufficient heat in the oxidation step, secondary air and fuel may also be provided. The combustion of the hydrogen, carbon monoxide, natural gas, or other combustible gas with air or oxygen thus provides the heat necessary for the decomposition. In those instances in which an organic liquid solvent is employed, additional heat is supplied by the combustion of such organic liquid. The combustible components are supplied in amount sufficient to maintain the particles in the reaction zone at the desired temperature as set forth above.

The cooling of the product is carried out in a controlled temperature region maintained at from 50° C. to 600° C., or more preferably from 75° C. to 400° C. for a period of time of from 0.01 to 1 second. The product stream leaving the combustion zone may be cooled by passage through condensers or by quenching, such as by the addition of cool air or other vapors and liquids, for example, water.

The present basic lead carbonate is particularly useful in the production of metallic lead having certain additives present therein for the improvement of the hardness of the said metallic lead. The product of the invention is also useful for obtaining metallic lead powder from the finely divided basic lead carbonate. Powdered metals have been employed for many years in the fabrication of low-strength parts in which porosity is desired, e.g., bearings. However, it has not been possible to prepare high strength metals by the powder metallurgy technique largely because of the difficulty in obtaining effective high strength bond between the individual metal particles which are fabricated by sintering in order to consolidate the individual metal particles into a fabricated metal object. The above described difficulties are particularly apparent when the metallic articles are subjected to high temperatures, particularly under heavy loads. These difficulties are particularly apparent in the case of metallic lead which, as is well known, is a physically weak metal.

Metallic lead, because of its radiation absorption characteristics, has now become a very desirable material in the construction of shielding systems in atomic reactors and power plants, both portable and stationary, based upon the use of atomic fission and fusion reactions.

It has, therefore, been attempted to increase the strength of lead, particularly by such methods as the alloying of the lead with various metals. This approach, however, has been of limited applicability.

It has now been found that the prior art difficulties encountered in the fabrication of shaped metal articles based upon particulate metallic lead powders may be overcome by employing a particular form of combinations of metal oxide as a starting material, in combination with powdered basic lead carbonate. It is desirable to provide very intimate combination of the basic lead carbonate and the metal oxide. Such combinations include the basic lead carbonate with a desired metal oxide, preferably an oxide which is not reducible by hydrogen at temperatures below 760° C. It is also desirable that the basic lead carbonate and the irreducible metal oxide be formed by utilizing an oxidizing flame into which flame a solution of a lead compound and a salt of the desired metal be introduced. In such a combustion flame process, the very finely divided intimate combination of the metal oxides together with basic lead carbonate is obtained as the product.

In the reduction of the said combination of basic lead carbonate with an irreducible metal oxide, for example, an oxide selected from the group consisting of silicon oxide, magnesium oxide, boron oxide, aluminum oxide, chromium oxide, titanium oxide, zirconium oxide, hafnium oxide, thorium oxide, and the rare earth oxides, particularly cerium oxide, neodymium oxide, praseodymium oxide, and lanthanum oxide, such modifying additives are provided by employing the flame process while feeding into the flame a solution of a soluble lead salt in combination with a solution, e. g., in the same solution or a separate solution, containing a soluble compound of silicon, magnesium, boron, aluminum, chromium, titanium, zirconium, hafnium, thorium, and the rare earths. The preferred group of rare earths are cerium, neodymium, praseodymium and lanthanum fed the soluble compounds in aqueous or organic solutions and yielding a non-reducible oxide in intimate combination with the basic lead carbonate.

The temperature employed in the reduction step is generally in the range of from 300° C. to 450° C., employing any of the gaseous reducing agents, such as hydrogen, carbon monoxide or technical gas mixtures such as cracked ammonia or incompletely combusted natural gas.

It has been found that the reduction of the present combinations of basic lead carbonate and non-reducible metal oxides may be carried out at temperatures more than 100° C. above the melting point of pure lead without melting the product. Under these conditions, the reduced lead-metal oxide mixtures are recovered from the reduction furnace in finely divided powder form.

The following examples illustrate specific embodiments of the invention.

Example 1

An aqueous solution was prepared by dissolving 5.0 pounds of lead acetate trihydrate in 11.0 pounds of water. This solution was fed to the burner of a wetted wall combustion reactor at the rate of 3.54 pounds per hour. Natural gas at the rate of 7.3 pounds per hour and air at the rate of 156 pounds per hour were also fed to the combustion reactor so as to produce an oxidizing flame. The lead acetate solution was atomized into the flame by means of a two fluid atomizing nozzle in which a portion of the natural gas feed was used as the atomizing fluid.

The combustion products were cooled by direct water sprays after which the finely divided solid product was recovered from the cooled combustion gases by water scrubbing to produce a slurry which was subsequently filtered and dried.

Electron microscope examination of the dry product revealed hexagonal plates ranging from 0.07 to 1.5 microns diameter with thicknesses of one-sixth to one-tenth the diameter. This material was identified by X-ray diffraction and chemical analysis to be substantially completely basic lead carbonate $[2PbCO_3 \cdot Pb(OH)_2]$.

Reduction of the basic lead carbonate by heating in the presence of hydrogen at 300° C. gives metallic lead.

Example 2

An aqueous solution was prepared by dissolving 1.44 pounds of lead nitrate together with 0.21 pounds of magnesium nitrate hexahydrate in 4.58 pounds of water. This solution was fed to the burner of a wetted wall combustion reactor at the rate of 2.7 pounds per hour. Natural gas at the rate of 6.9 pounds per hour and air at the rate of 173.5 pounds per hour were also fed to the combustion reactor so as to produce an oxidizing flame. The solution of metal salts was atomized into the flame by means of a two fluid atomizing nozzle in which a portion of the natural gas feed was used as the atomizing fluid.

The combustion products were cooled by direct water sprays, after which the finely divided solid product was recovered from the cooled combustion gases by water scrubbing to produce a slurry which was subsequently filtered and dried.

The composition of the product was determined by chemical and X-ray diffraction analysis to be: 98% basic lead carbonate $[2PbCO_3 \cdot Pb(OH)_2]$, and 2% MgO. Electron microscopic examination of the product revealed roughly circular, sometimes hexagonal plates 0.03 to 0.35 micron in diameter and 0.01 to 0.03 micron thick.

Reduction of the combination product by a stream of hydrogen at 400° C. gives a modified form of metallic lead which is considerably harder than conventional lead such as is obtained by the procedure of Example 1.

Example 3

An aqueous solution was prepared by dissolving 3.8 pounds of magnesium nitrate hexahydrate together with 76.1 pounds of lead nitrate in 210 pounds of water. This solution was fed to the burner of a refractory lined combustion reactor at the rate of 71.4 pounds per hour. Natural gas at the rate of 75 pounds per hour and air at the rate of 1600 pounds per hour were also fed to the combustion reactor so as to produce an oxidizing flame. The solution of metal salts was atomized into the flame by means of a two fluid atomizing nozzle in which a portion of the natural gas feed was used as the atomizing fluid.

The combustion products were cooled by direct water sprays after which the finely divided solid product was recovered from the cooled combustion gases by water scrubbing to produce a slurry which was subsequently filtered and dried.

The composition of the product was determined by chemical and X-ray diffraction analysis to be predominantly basic lead carbonate plus 0.9% MgO and a trace of PbO (yellow).

Electron microscope examination of the product revealed very thin, angular (usually hexagonal) monocrystalline plates ranging from 0.015 to 0.55 micron in width.

What is claimed is:

1. A process for the production of a basic lead carbonate which comprises volatilizing a solution of a soluble lead salt into an oxidizing flame maintained at a temperature of from 600° C. to 1600° C., and having a partial pressure of carbon dioxide in the range of from 1% to 50% by volume, decomposing the said compound, thereafter cooling the said flame to a temperature in the range of from 50° C. to 600° C. for a period of time of 0.01 second to 1 second, and collecting as a product a basic lead carbonate.

2. A process for the production of basic lead carbonate which comprises volatilizing an organic solution of a soluble lead salt into an oxidizing flame maintained at a temperature of from 600° C. to 1600° C., and having a partial pressure of carbon dioxide in the range of from 1% to 50% by volume, decomposing the said compound, thereafter cooling at the said flame to a temperature in the range of from 50° C. to 600° C. for a period of time of 0.01 second to 1 second, and collecting as a product a basic lead carbonate.

3. A process for the production of basic lead carbonate which comprises volatilizing an aqueous solution of a soluble lead salt into an oxidizing flame maintained at a temperature of from 600° C. to 1600° C., and having a partial pressure of carbon dioxide in the range of from 1% to 50% by volume, decomposing the said compound, thereafter cooling the said flame to a temperature in the range of from 50° C. to 600° C. for a period of time of 0.01 second to 1 second, and collecting as a product a basic lead carbonate.

4. A process for the production of basic lead carbonate which comprises volatilizing a solution of a soluble lead salt in combination with another soluble compound selected from the group consisting of compounds of silicon, magnesium, boron, aluminum, chromium, titanium, zirconium, hafnium, thorium and the rare earths into an oxidizing flame maintained at a temperature of from 600° C. to 1600° C., and having a partial pressure of carbon dioxide in the range of from 1% to 50% by volume, decomposing the said lead and other compound, thereafter cooling the said flame to a temperature in the range of from 50° C. to 600° C. for a period of time of 0.01 second to 1 second, and collecting as a product a basic lead carbonate.

5. A process for the production of basic lead carbonate which comprises volatilizing a solution of lead nitrate in combination with magnesium nitrate into an oxidizing flame mantained at a temperature of from 600° C. to 1600° C., and having a partial pressure of carbon dioxide in the range of from 1% to 50% by volume, decomposing the said lead and magnesium compounds, thereafter cooling the said flame to a temperature in the range of from 50° C. to 600° C. for a period of time of 0.01 second to 1 second, and collecting as a product a basic lead carbonate.

References Cited in the file of this patent

UNITED STATES PATENTS

| | | |
|---|---|---|
| 1,131,144 | Kessler | Mar. 9, 1915 |
| 1,652,119 | Halverson et al. | Dec. 6, 1927 |
| 2,737,445 | Nossen | Mar. 6, 1956 |

FOREIGN PATENTS

| | | |
|---|---|---|
| 421,003 | Great Britain | Dec. 12, 1934 |
| 1,056,008 | France | Oct. 21, 1953 |

OTHER REFERENCES

Mellor: Comprehensive Treatise on Inorganic and Theoretical Chemistry, Longman Green Co., New York, 1927, vol. VII, page 863.